(12) United States Patent
Chamayou et al.

(10) Patent No.: US 9,303,094 B2
(45) Date of Patent: *Apr. 5, 2016

(54) POLYMERIZATION PROCESS

(71) Applicant: INEOS SALES (UK) LIMITED, Hampshire (GB)

(72) Inventors: Jean-Louis Chamayou, Carry le Rouet (FR); Benoit Sibourd, Peyrolles en Provence (FR)

(73) Assignee: INEOS SALES (UK) LIMITED, Lyndhurst, Hampshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/538,460

(22) Filed: Nov. 11, 2014

(65) Prior Publication Data

US 2015/0166687 A1 Jun. 18, 2015

Related U.S. Application Data

(62) Division of application No. 13/695,387, filed as application No. PCT/EP2011/055857 on Apr. 13, 2011, now Pat. No. 8,916,658.

(30) Foreign Application Priority Data

Apr. 30, 2010 (EP) ..................................... 10161593

(51) Int. Cl.
*C08F 2/00* (2006.01)
*C08F 210/00* (2006.01)
(Continued)

(52) U.S. Cl.
CPC ............... *C08F 2/001* (2013.01); *B01J 8/1872* (2013.01); *C08F 210/16* (2013.01); *B01J 2208/0061* (2013.01); *C08F 2400/02* (2013.01); *C08F 2410/05* (2013.01)

(58) Field of Classification Search
CPC ............ B01J 8/1872; B01J 2208/0061; C08F 210/16; C08F 2/2001; C08F 2400/02; C08F 2410/05; C08F 210/08; C08F 2500/15; C08F 2500/07; C08F 210/14; C08F 2500/12
USPC ..................................................... 526/67, 348
See application file for complete search history.

(56) References Cited

U.S. PATENT DOCUMENTS 8,916,658 B2 * 12/2014 Chamayou ............. B01J 8/1872
526/348
2007/0135591 A1 6/2007 Brown et al.

FOREIGN PATENT DOCUMENTS

EP 0 816 395 A2 1/1998
EP 1 182 216 A2 2/2002
(Continued)

OTHER PUBLICATIONS

Specification of Co-Pending National Phase U.S. Appl. No. 13/695,370, filed Oct. 30, 2012; PCT Int'l Application No. PCT/EP2011/055856, WO 2011/134797 A1, filed Apr. 13, 2011); 30 pgs.

(Continued)

*Primary Examiner* — William Cheung
(74) *Attorney, Agent, or Firm* — Nixon & Vanderhye P.C.

(57) ABSTRACT

Process for the transition between an ethylene co-polymerization process in a polymerization reactor in the presence of a catalyst and of ethylene E and an olefin co-monomer A to produce an ethylene copolymer PEA into an ethylene co-polymerization process carried out in the same polymerization reactor in the presence of a catalyst and of ethylene E and an olefin co-monomer B to produce an ethylene copolymer PEB. Co-monomers A and B are different and are both present in the reactor during at least part of the transition from PEA to PEB. The transition is performed continuously by (i) starting the transition by stopping steady state production of ethylene copolymer PEA and (ii) ending the transition when steady state production of ethylene copolymer PEB is achieved.

19 Claims, 1 Drawing Sheet

(51) Int. Cl.
  *B01J 8/18* (2006.01)
  *C08F 210/16* (2006.01)

(56) References Cited

FOREIGN PATENT DOCUMENTS

| EP | 1 810 991 | A1 | | 7/2007 |
| EP | 2 172 495 | A1 | | 4/2010 |
| EP | 2172495 | A1 | * | 4/2010 |
| WO | WO 96/02583 | A1 | | 2/1996 |
| WO | WO 01/67189 | A1 | | 9/2001 |
| WO | WO 2006/069204 | A2 | | 6/2006 |
| WO | WO 2006/138007 | A1 | | 12/2006 |
| WO | WO 2008/076386 | A1 | | 6/2008 |

OTHER PUBLICATIONS

International Search Report, Co-Pending Int'l Application No. PCT/EP2011/055856, (3 pgs), mailed Jun. 29, 2011.

* cited by examiner

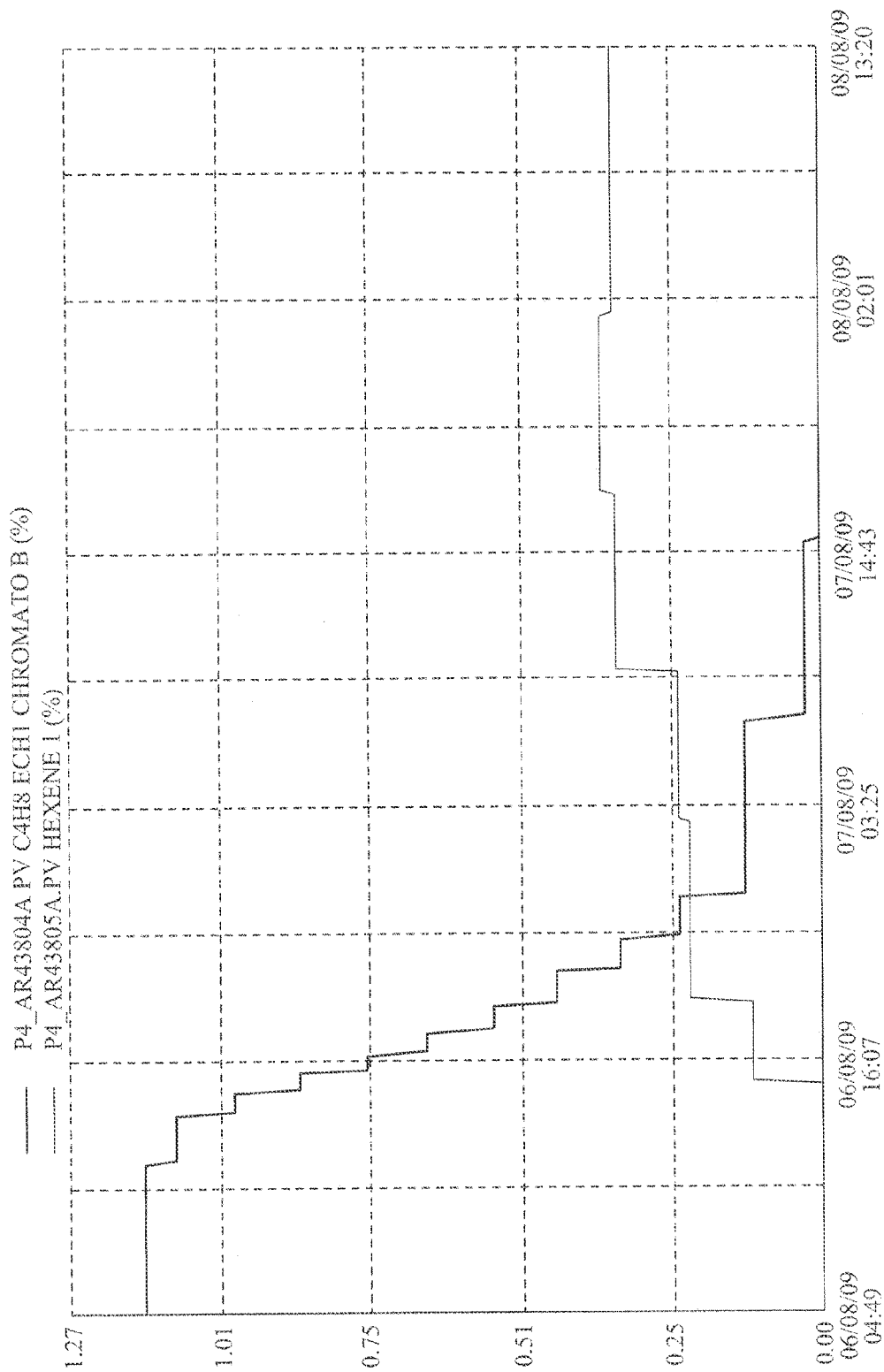

POLYMERIZATION PROCESS

This application is a divisional of application Ser. No. 13/695,387, filed Oct. 30, 2012, now issued as U.S. Pat. No. 8,916,658, which is a 371 of PCT/EP2011/055857, filed Apr. 13, 2011, which claims priority to European Patent Application No. 10161593.8 filed Apr. 30, 2010, the entire contents of each of which are hereby incorporated by reference.

The present invention relates to a process for the transition between two ethylene copolymers containing a different comonomer.

In particular, the present invention relates to a process for the continuous transition between two ethylene copolymers containing a different comonomer.

More particularly, the present invention relates to a process for the continuous transition in a gas phase fluidised bed reactor between two ethylene copolymers containing a different comonomer.

BACKGROUND OF THE INVENTION

It is well known that polymerisation conditions can be adjusted to produce a wide variety of products. This is also true for the production of ethylene copolymers. It is not unusual that one reactor system can produce resins useful in injection moulding, blow moulding, rotomoulding applications, wire coating, piping and films. Fluidised bed technology can also be used to make a wide variety of polyolefin products, e.g., homopolymers and copolymers of polyethylene, polypropylene, C4-C12 alpha olefins; ethylene-propylene-diene monomer (EPDM), polybutadiene, polyisoprene, and other rubbers.

However, generally, the polymer products made by a given reactor system use the same reactants but in different ratios and at different temperatures. Each of these polymer products can be made with a number of different resin properties, or grades. Each grade of polymer product has a narrow limit on its properties, e.g., density and melt index. Industrial reactors require time to adjust to the new conditions (e.g., temperature, reactant pressures, and reactant ratios) and produce material in the interim that is constantly changing but not within the properties (e.g., melt index and density) of either the old product or the new one. New products cannot be made instantaneously and require a quantifiable period of transiency in becoming adjusted to the new, desired conditions.

Generally, industrial control systems for gas phase, fluidised bed polymerisation reactors are designed to permit the operators to control the reactor by allowing the operators to select a desired melt index and density. Correlations of these properties are usually well known by the operators and those in the art for the particular reactor design and catalyst used.

The prior art has devised a number of methods to reduce the transient, off grade material. These methods typically involve some combination of adjusting the automatic flow/ratio controllers to a new value either at or above the ultimately desired value ("dial-in transition" and "overshoot"), removing the reactant gas entirely ("inventory blow down"), reducing the level of the catalyst ("low bed"), and adding a nonreactive gas ("nitrogen addition").

DE 4,241,530 describes using a kill gas to stop a polymerization reaction, blowing the gas inventory for that reaction out of the reactor, and rebuilding a new gas inventory for a new product. This method reduces transition material. The cost associated with throwing away the old gas inventory and rebuilding a new inventory is very high for commercial transitions between closely related grades.

The prior art also discloses additional discontinuous transition process, said process usually including a gas phase purge and the addition of catalyst killer compounds.

McAuley et al. ("Optimal. Grade Transitions in a Gas Phase Polyethylene Reactor", AIChE J., Vol. 38, No. 10: 1992, pp. 1564-1576) discloses three manual, labour-intensive transition strategies for gas phase polyethylene reactors. The first is an adjustment to the controls to overshoot the melt index and density values. The hydrogen feed and comonomer feeds are increased to meet the designated properties. The second is an increase in temperature and manipulation of the slow vent to move the melt index of the produced product. The third is a drop in the catalyst level while keeping the bed resin residence time at a constant value to reduce off grade production.

Debling, et al., "Dynamic Modeling of Product Grade Transitions for Olefin Polymerization Processes", AIChE J., vol. 40, no. 3:1994, pp. 506-520) compares transition performance of different types of polyethylene reactors. The article discloses seven separate manual, labour intensive transition strategies: (1) dialing in the final aim transition; (2) gas inventory blow down and simple dial-in transition; (3) low bed and simple dial-in transition; (4) gas inventory blow down and overshoot of melt index and density transition; (5) low bed, gas inventory blow down, and overshoot transition; (6) low bed and overshoot transition; and (7) gas inventory blow down, overshoot, and nitrogen addition transition.

EP798318 claims a process for controlling a gas phase polymerization reaction in a reactor when changing from a first product made at a first set of conditions to a second product made at a second set of conditions, said process comprising the steps of:

(a) comparing the first product reaction temperature and the second product reaction temperature, change the product reaction temperature setpoint to the second product reaction temperature if said second product reaction temperature is lower than said first product reaction temperature, (b) setting a melt index setpoint that is either 0-150% higher or 0-70% lower than the desired second product melt index value, (c) setting a reaction temperature setpoint that is: 1-15 DEG C. above the desired second product reaction temperature if the second product melt index value is higher than the first product melt index value, or 1-15 DEG C. below the actual second product reaction temperature if the second product melt index is lower than the first product melt index, (d) setting a product rate-limiting reactant partial pressure setpoint that is: 1-25 psig either below the first product rate-limiting reactant partial pressure if the second product melt index value is higher than the first product melt index value, or above the first product rate-limiting reactant partial pressure if the second product melt index value is lower than the first product melt index value;

(e) maintaining said melt index setpoint, temperature setpoint, and rate-limiting reactant partial pressure setpoint values until said polymerization product exhibits an average melt index and average product density with an acceptable range from the desired second product melt index value and second product density value;

(f) changing said melt index setpoint to the desired second product melt index value;

(g) changing said product reaction temperature setpoint to a value that is: (i) 0-15 DEG C. above said desired second product reaction temperature if the second product melt index value is higher than the first product melt index value, or (ii) 0-15 DEG C. below said desired second product reaction temperature if the second product melt index value is lower than the first product melt index value;

(h) changing said rate-limiting partial pressure setpoint to a value that is: (i) 0-25 psig either below the desired second product rate-limiting partial pressure if the second melt index value is higher than the first melt index value, or (ii) 0-25 psig above the second product rate-limiting partial pressure if the second melt index value is lower than the first melt index value; and (i) changing the reaction temperature setpoint and the rate-limiting reactant partial pressure setpoint values to the desired second product reaction temperature and second rate-limiting reactant partial pressure value when the reaction product exhibits an average melt index value within acceptable limits of the second product melt index value.

EP798318 depicts in its FIGS. 3-5 a flowchart of its process control. The initial steps are similar to FIGS. 1-2 (which depict the EP798318) prior art methods, i.e. a transition including the lowering of the bed level.

All the examples of EP798318 relate to transitions between ethylene copolymers having the same comonomer, i.e. hexene.

EP1578808 relates to processes for transitioning among polymerization catalyst systems, preferably catalyst systems, which are incompatible with each other. In particular, it relates to processes for transitioning among olefin polymerization reactions utilizing Ziegler-Natta catalyst systems, metallocene catalyst systems and chromium-based catalyst systems.

Again, this prior art includes inter alia the step of lowering the reactor bed during the transition; and the examples relate to transitions between ethylene copolymers having the same comonomer, i.e. hexene.

SUMMARY OF THE INVENTION

Despite this wide variety of available schemes, the Applicants could not find in the prior art a satisfactory process for the transition between two ethylene copolymers containing a different comonomer. It is therefore an object of the present invention to provide such process allowing to reduce the amount of off grade material produced during the transition, e.g. to provide a better control over potential hot spots and/or static in the reactor and thus reducing and/or eliminating the formation of agglomerates, lumps and/or sheets. Additional benefits provided by the present invention will be depicted in the description and example hereafter.

The present invention provides a process for the transition between an ethylene co-polymerization process carried out in a polymerization reactor in the presence of ethylene E and an olefin co-monomer A to produce an ethylene copolymer PEA into an ethylene co-polymerization process carried out in the same polymerization reactor in the presence of ethylene E and an olefin co-monomer B to produce an ethylene copolymer PEB characterised in that co-monomer A and co-monomer B are different;
co-monomer A and co-monomer B are both present in the reactor during at least part of the transition from PEA to PEB; and
the transition is performed continuously.

For the purpose of the present description and appended claims, the transition is defined as the period between the steady state production of the copolymer PEA and the steady state production of the copolymer PEB.

The respective steady state productions of PEA and PEB exclusively relates to copolymers. Whilst some terpolymer TEAB is inherently produced during the transition, the present invention does not cover the transition between terpolymers.

The transition according to the present invention is performed continuously. For the purpose of the present invention and appended claims, a continuous transition must fulfil at least one of the following conditions:

1. the polymerisation production rate ("R"), defined as the amount of polymer produced by unit of time (e.g. tons/hour), must fulfil the following equation $$0.55 \times R_{PEA} < R_T < 1.45 \times R_{PEA}$$

wherein $R_{PEA}$ is the steady state production rate of the copolymer PEA just before the start of the transition, and $R_T$ is the production rate of the polymer during the transition;

a preferred polymerisation production rate of the present invention must fulfil the following equation $$0.80 \times R_{PEA} < R_T < 1.20 \times R_{PEA}$$

2. no deinventorying of the reaction system contents is operated during the transition. For the man skilled in the art, deinventorying means significantly purging the reactor, e.g. by removing at least 50% by weight of the gases (e.g. monomer) and/or at least 50% by weight of the solids (e.g. the polymer) and/or at least 50% by weight of the liquids (e.g. comonomer and/or alkane) present in the reaction loop. For example, for gas phase polymerisation reactors, the ethylene partial pressure ($pC_2^=$) must fulfil the following equation $$0.55 \times pC_2^={}_{PEA} < pC_2^={}_T < 1.45 \times pC_2^={}_{PEA}$$

wherein $pC_2^={}_{PEA}$ is the ethylene partial pressure just before the start of the transition, and $pC_2^={}_T$ is the ethylene partial pressure during the transition; a preferred ethylene partial pressure of the present invention must fulfil the following equation $$0.80 \times pC_2^={}_{PEA} < pC_2^={}_T < 1.20 \times pC_2^={}_{PEA}$$

For example, for slurry polymerisation reactors, the main monomer (ethylene or propylene) feed rate (qMM) must fulfil the following equation $$0.55 \times qMM_{PEA} < qMM_T < 1.45 \times qMM_{PEA}$$

wherein $qMM_{PEA}$ is the main monomer feed rate just before the start of the transition T, and $qMM_T$ is the main monomer feed rate during the transition T; a preferred main monomer feed rate of the present invention must fulfil the following equation $$0.80 \times qMM_{PEA} < qMM_T < 1.20 \times qMM_{PEA}.$$

3. the transition is preferably operated in the absence of injection of a catalyst killer (also identified as polymerisation inhibitor and/or poison). Whilst not preferred, the addition of a catalyst killer during the transition is tolerated only if it does not reduce by more then 40%, preferably more than 20%, the activity of the catalyst. The catalyst killer is a compound or mixture of compounds that is capable of deactivating the catalyst system. For the purposes of the present application, the term "catalyst killer" does not include the minor portion of similar compounds that may be present in the monomer or comonomer feed streams during normal polymerisation conditions, such as internal olefins or hydrogen, for example. An exemplary catalyst killer includes one or more compounds selected from the group consisting of water, oxygen, alcohols, glycols, phenols, ethers, carbonyl compounds such as ketones, aldehydes, carboxylic acids, esters, fatty acids, alkynes such as acetylene, amines, nitrites, nitrous compounds, pyridine, pyroles, carbonylsulfide (COS), mercaptans, derivatives thereof, or any mixtures or combinations thereof.

4. the polymerisation catalyst activity A, defined as the amount of polymer produced by unit of time and by amount of catalyst (e.g. g/hour/g cata), must fulfil the following equation $$0.55 \times A_{PEA} < A_T < 1.45 \times A_{PEA}$$

wherein $A_{PEA}$ is the activity of the catalyst system used for the production of the copolymer PEA just before the start of the transition (i.e. in steady state operations), and $A_T$ is the catalyst activity of the catalyst system used during the transition;

a preferred polymerisation catalyst activity of the present invention must fulfil the following equation $$0.80 \times A_{PEA} < A_T < 1.20 \times A_{PEA}$$

For the purpose of the present description and appended claims, it will be apparent for the man skilled in the art that $R_T$ the production rate during the transition, $pC_{2T}^=$ the ethylene partial pressure during the transition, and/or $qMM_T$ the main monomer feed rate during the transition T, and $A_T$ the catalyst activity of the catalyst system during the transition may vary during the transition. The above conditions define boundaries between which said parameters may preferably vary.

According to the most preferred embodiment of the present invention, condition 1 (polymerisation production rate) must be fulfilled; according to another preferred embodiment of the present invention, a continuous transition must fulfil at least two, preferably three, most preferably all of the above recited conditions.

The man skilled in the art knows how to control the polymer production rate in a continuous polymerisation process, e.g. by varying the monomer feed rate and/or the comonomer feed rate and/or the catalyst injection rate, etc. . . .

The man skilled in the art also knows how to control the activity of a catalyst, e.g. by varying process conditions like e.g. the catalyst residence time and/or the partial pressure of ethylene and/or the partial pressure of the comonomer and/or the partial pressure of hydrogen, etc. . . .

One of the many advantages of the present invention over the prior art relates directly to the respect of the environment. Indeed, whilst the prior art operates transitions with substantial hydrocarbon release (e.g. gas reactor inventory renewal), i.e. with important pollution of the atmosphere, the applicants have managed to develop a technology which reduces considerably—or even eliminates—the said releases.

According to the present invention, co-monomer A and co-monomer B are both present in the reactor during at least part of the transition from PEA to PEB; preferably, such simultaneous presence of both co-monomer A and co-monomer B lasts for at least 50% of the duration of the transition. According to a preferred embodiment of the present invention, the transition from PEA to PEB comprises a period during which both fresh co-monomer A and fresh co-monomer B are fed simultaneously in the reactor.

According to a preferred embodiment of the present invention, the transition is operated between catalysts belonging to the same catalyst family. For example, if a chromium catalysts is used as the catalyst for producing PEA, the catalyst for producing PEB will also be a chromium catalyst; if a Ziegler-Natta catalyst is used as the catalyst for producing PEA, the catalyst for producing PEB will also be a Ziegler-Natta catalyst; if a metallocene catalyst is used as the catalyst for producing PEA, the catalyst for producing PEB will also be a metallocene catalyst.

Most preferably, the same catalyst is used for the production of both the copolymer PEA and the copolymer PEB.

According to a preferred embodiment of the present invention, the melt index (MI) of the copolymer PEA and copolymer PEB fulfil the following equation $$0.55 \times MI(PEA) < MI(PEB) < 1.45 \times MI(PEA)$$

preferably $$0.9 \times MI(PEA) < MI(PEB) < 1.1 \times MI(PEA)$$

more preferably $$0.95 \times MI(PEA) < MI(PEB) < 1.05 \times MI(PEA)$$

wherein the melt index is preferably measured using the standard ISO 1133 at a temperature of 190° C. under load of 5 Kg.

According to a preferred embodiment of the present invention, the density (d) of the copolymer PEA and copolymer PEB fulfil the following equation $$[d(PEA)-0.010] < d(PEB) < [d(PEA)+0.010]$$

preferably $$[d(PEA)-0.005] < d(PEB) < [d(PEA)+0.005]$$

more preferably $$[d(PEA)-0.001] < d(PEB) < [d(PEA)+0.001]$$

wherein the density is given in Kg/m3 and is preferably measured according to the standard ISO 1183-1 (Method A).

According to an additional preferred embodiment of the present invention, there is no substantial change of the reactor solids inventory during the transition. For example, this may be translated by the fact that the mass of polymer present in the reactor during the transition is at least 75% of the mass of polymer just before the start of the transition (i.e during steady production of the copolymer PEA), preferably at least 80%, more preferably at least 90%, most preferably at least 95%. For example, for a gas phase fluidised bed reactor, this may be translated by the fact that the reactor bed height during the transition is at least 75% of the reactor bed height just before the start of the transition (i.e during steady production of the copolymer PEA), preferably at least 80%, more preferably at least 90%, most preferably at least 95%. The man skilled in the art knows how to measure bed heights, e.g by using nucleonic devices or pressure differential measurements. For the purpose of the present invention and appended claims, the bed height is measured by using the pressure measurement method as described in the Perry's Chemical Engineers' Handbook, Seventh Edition, International Edition 1998, page 17-13.

The transitioning process of the present invention is thus applied to a continuous polymerisation reaction process. Said polymerisation reaction can take place in any appropriate reactor, e.g. a gas phase reactor, a gas/liquid phase reactor or a slurry reactor.

When the olefin polymerisation reaction is in slurry phase, the reactor is preferably a slurry loop reactor. Slurry phase polymerisation of olefins is well known wherein an olefin monomer and an olefin comonomer are polymerised in the presence of a catalyst in a diluent in which the solid polymer product is suspended and transported. Liquid full loop reactors are particularly well known in the art and are described for example in U.S. Pat. Nos. 3,152,872, 3,242,150 and 4,613,484.

Polymerisation is typically carried out at temperatures in the range 50-125 degrees C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 20 to 120 cubic meters.

When polymerisation reaction is in the gas phase, the method may be carried out in a stirred and/or gas fluidised bed. Gas phase polymerisation of a mixture of polymerisable olefin to produce normally solid polymer substances using a quench-cooled, gas-phase polymerisation reactor containing a sub-fluidised particulate bed of polymerised olefin has been described in a number of patents including: U.S. Pat. No. 3,957,448, U.S. Pat. No. 3,965,083 and U.S. Pat. No. 3,971,768. These US patents describe polymerisation processes and apparatus in which polymer is formed from gaseous olefin in horizontal stirred-bed vessels.

According to the most preferred embodiment of the present invention, the method of the present invention is carried out continuously in the gas phase in a fluidised-bed reactor. Such processes are well-known, and examples include EP 0 475 603, EP 1 240 217, EP 1 484 344 and EP 0 855 411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled.

Liquid, especially but not limited to liquid condensed from the cooled reaction mixture during recycle, may be injected into the reaction zone. Vaporisation of the liquid in the reaction zone provides the effect of cooling directly in the reaction zone.

The method of the invention is particularly suitable for very large industrial reactors; in accordance with one embodiment of the present invention, the reactor used makes it possible to produce quantities of polymer of more than 3000 kg/h, preferably more than 10,000 kg/h. The process of the invention is further particularly suitable for high space time yields (in terms of weight of polymer produced per unit volume of reactor space per unit time) in commercial gas fluidised bed reactors; consequently, according to a further embodiment of the present invention, space time yields are higher than 25 kg/m$^3$/h, preferably higher than 50 kg/m$^3$/h, more preferably higher than 80 kg/m$^3$/h. The Space Time Yield (STY) expressed in [kg/(m$^3$×h)] is well known and represents the weight of polymer produced per unit of time and per unit of reactor volume. The weight of polymer production per unit of time can also advantageously be calculated as the average steady (co)monomers feed rate (ignoring therefore the slight fluctuations due to (co)monomers losses, e.g. purges).

The principal olefin according to the present invention is ethylene. Ethylene represents more than 50% by weight of the polymer produced.

Comonomer olefins are preferably selected from olefins having 3 to 12 carbon atoms. Suitable comonomer olefins are propylene, 1-butene, 1-hexene, 4-methyl-1-pentene and 1-octene. Preferably, the principal olefin is ethylene and the comonomer is 1-butene, 1-hexene or 1-octene.

The reaction mixture may also comprise one or more inert compounds, especially inert gases such as nitrogen, and/or one or more saturated hydrocarbons such as ethane, propane, butane, pentane and hexane.

The method according to the present invention may be used to prepare a wide variety of polymer products, e.g. linear low density polyethylene (LLDPE), especially based on copolymers of ethylene with 1-butene, 1-hexene or 1-octene. This method is particularly suitable for the production of very low density polyethylene (VLDPE). A further suitable polyethylene product is high density polyethylene (HDPE), especially copolymers of ethylene with a small portion of higher alpha olefin, for example, 1-butene, 1-pentene, 1-hexene or 1-octene.

The method is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The method of the present invention may be applied to polymerisation processes using any suitable polymerisation catalyst, including Ziegler-Natta type catalysts chromium oxide type catalysts, and metallocene type catalysts.

The copolymerisation may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the patents U.S. Pat. No. 4,260,709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from $10^{-5}$ to 3, preferably from $10^{-3}$ to $10^{-1}$, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The copolymerisation may thus also be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula CrO3, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminium, in particular in the form of aluminium oxide; it can be used as it is or optionally in the form of a coated catalyst or prepolymer containing, for example, from $10^{-5}$ to 3, preferably from $10^{-3}$ to $10^{-1}$, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

The method of the present invention is also preferably applied to a polymerisation process in which the catalyst is a metallocene-type catalyst.

With regards to particular metallocene-type catalysts, mention may be made, by way of example, of those corresponding to the formula

[L]mM[A]n where L is a bulky ligand; A is a leaving group, M is a transition metal and m and n are such that the total valency of the ligand corresponds to the valency of the transition metal. The ligands L and A may be bridged. L is generally a ligand of the cyclopentadienyl type. Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051. Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149,819, 5,243,001, 5,239,022, 5,276,208, 5,296,434, 5,321,106, 5,329,031, 5,304,614, WO 93/08221, WO 93/08199 and EP 0 578 838. The preferred transition metal compounds of the catalyst are those of group 4, in particular zirconium, titanium and hafnium.

The metallocene catalyst may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula (C5 R'm)p R"s (C5 R'm) Me Q3-p-x, or R"s (C5 R'm)2 MeQ'
where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylatyl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, m is 4 and p is 1.

The metallocene catalysts are generally used with an activator or cocatalyst. Examples which may be mentioned include alumoxane and/or ionic or neutral ionising activators, or compounds such as pentafluorophenyl tri(n-butyl)ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises

A) an inert support,

B) a group 4-10 metal complex corresponding to the formula:

where M is a metal of one of groups 4 to 10 of the Periodic Table of the Elements, Cp is an anionic ligand group, Z is a divalent moiety linked to Cp and linked to M, comprising boron or an element of group 14 of the Periodic Table of the Elements, and further comprising nitrogen, phosphorus, sulphur or oxygen;

X is a neutral conjugated diene ligand group having up to 60 atoms, or a dianionic derivative, and C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process.

The catalyst or the prepolymer may be introduced in the reactor continuously or discontinuously, preferably continuously.

POLYMERISATION EXAMPLE

An industrial fluidised bed gas phase reactor having a diameter of 4.5 m was operated at 110 C temperature and 23 bara pressure (with ethylene at a pressure of 7 bars). In the reactor was added ethylene, butene (at a rate of 250 kg/hr), nitrogen and a polymerisation catalyst (in the form of a prepolymer) prepared as described in example 1 of WO9324542 so that an ethylene-butene-copolymer having a melt index of 4 g/10 min and a density 950 kg/m3 was formed under steady state conditions (production rate of 25 T/hr and prepolymer injection rate of 120 kg/h).

The transition from a PE-butene copolymer to a PE-hexene copolymer started with a gradual decrease of the rate of introduction of butene, and a gradual increase of the rate of hexene.

THE BRIEF DESCRIPTION OF THE FIGURE

FIG. 1 indicates the respective concentration (volume %) of butene and hexene measured in the reactor during the transition.

During the transition, the polymerisation production rate ("R") remained within +−10% of 25 T/hr, no additional release of ethylene from the reactor was made, no catalyst killer was used, and the polymerisation catalyst activity remained within +−10% of its activity during the steady state production of the copolymer PE-butene.

The reactor bed height during the transition remained within +−10% of the reactor bed height just before the start of the transition (which was 16 m).

The total transition time duration was 30 hours.

After the transition, the copolymer PE-hexene was produced under steady state conditions (production rate of 25 T/hr); said ethylene-hexene-copolymer had a melt index of 4 g/10 min and a density 950 kg/m3.

The invention claimed is:

1. Process for the transition between an ethylene co-polymerization process carried out in a polymerization reactor in the presence of a catalyst and of ethylene E and an olefin co-monomer A to produce an ethylene copolymer PEA into an ethylene co-polymerization process carried out in the same polymerization reactor in the presence of a catalyst and of ethylene E and an olefin co-monomer B to produce an ethylene copolymer PEB wherein co-monomer A and co-monomer B are different;

co-monomer A and co-monomer B are both present in the reactor during at least part of the transition from PEA to PEB;

said process comprising carrying out the transition continuously by performing the steps of:

(i) starting the transition by stopping steady state production of ethylene copolymer PEA and, (ii) ending the transition when steady state production of ethylene copolymer PEB is achieved, wherein the polymerisation production rate, defined as the amount of polymer produced by unit of time (e.g. tonnes/hour), must fulfill the following equation $$0.55 \times R_{PEA} < R_T < 1.45 \times R_{PEA}$$

wherein $R_{PEA}$ is the steady state production rate of the copolymer PEA just before the start of the transition, and $R_T$ is the production rate of the polymer during the transition.

2. Process according to claim 1 wherein the polymerisation production rate ("R"), defined as the amount of polymer produced by unit of time (e.g. tonnes/hour), must fulfill the following equation $$0.55 \times RPEA < RT < 1.45 \times RPEA$$

wherein RPEA is the steady state production rate of the copolymer PEA just before the start of the transition, and RT is the production rate of the polymer during the transition.

3. Process according to claim 1 wherein the polymerisation production rate must fulfill the following equation $$0.80 \times R_{PEA} < R_T < 1.20 \times R_{PEA}$$

4. Process according to claim 1 wherein no deinventorying of the reaction system contents is operated during the transition.

5. Process according to claim 1 wherein an ethylene partial pressure ($pC_2=$) must fulfill the following equation $$0.55 \times pC_{2=PEA} < pC_{2=T} < 1.45 \times pC_{2=PEA}$$

wherein $pC_{2=PEA}$ is the ethylene partial pressure just before the start of the transition, and $pC_{2=T}$ is the ethylene partial pressure during the transition.

6. Process according to claim 5 wherein an ethylene partial pressure must fulfill the following equation $$0.80 \times pC_{2=PEA} < pC_{2=T} < 1.20 \times pC_{2=PEA}.$$

7. Process according to claim 1 wherein the transition is operated in the absence of injection of a catalyst killer.

8. Process according to claim 1 wherein a polymerisation catalyst activity A, defined as the amount of polymer produced by unit of time and by amount of catalyst (e.g. g/hour/g cata), must fulfill the following equation $$0.55 \times A_{PEA} < A_T < 1.45 \times A_{PEA}$$

wherein $A_{PEA}$ is the activity of the catalyst system used for the production the copolymer PEA just before the start of the transition (i.e. in steady state operations), and $A_T$ is the catalyst activity of the catalyst system used during the transition.

9. Process according to claim 8 wherein a polymerisation catalyst activity must fulfill the following equation $$0.80 \times A_{PEA} < A_T < 1.20 \times A_{PEA}.$$

10. Process according to claim 1 wherein the transition from PEA to PEB comprises a period during which both fresh co-monomer A and fresh co-monomer B are fed simultaneously in the reactor.

11. Process according to claim 1 wherein the transition is operated between catalysts belonging to the same catalyst family.

12. Process according to claim 1 where the same catalyst is used for the production of both the copolymer PEA and the copolymer PEB.

13. Process according to claim 1 wherein the reactor is a gas phase fluidised bed reactor.

14. Process according to claim 1 wherein the mass of polymer present in the reactor during the transition is at least 75% of the mass of polymer just before the start of the transition (i.e. during steady production of the copolymer PEA).

15. Process according to claim 1 wherein the comonomer olefins are selected from olefins having 3 to 12 carbon atoms.

16. Process according to claim 14 wherein the mass of polymer present in the reactor during the transition is at least 90% of the mass of polymer just before the start of the transition.

17. Process according to claim 14 wherein the mass of polymer present in the reactor during the transition is at least 95% of the mass of polymer just before the start of the transition.

18. Process according to claim 15 wherein the comonomer olefins are selected from the group consisting of propylene, 1-butene, 1-hexene, 4-methyl-1-pentene and 1-octene.

19. Process according to claim 15 wherein the comonomer olefins are selected from the group consisting of 1-butene, 1-hexene and 1-octene.

* * * * *